Sept. 26, 1961 R. MARECHAL 3,001,821
ADJUSTABLE SEAT STRUCTURE
Filed June 29, 1959 6 Sheets-Sheet 1
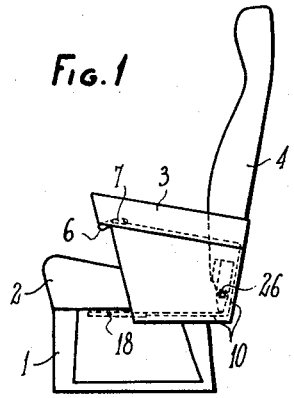
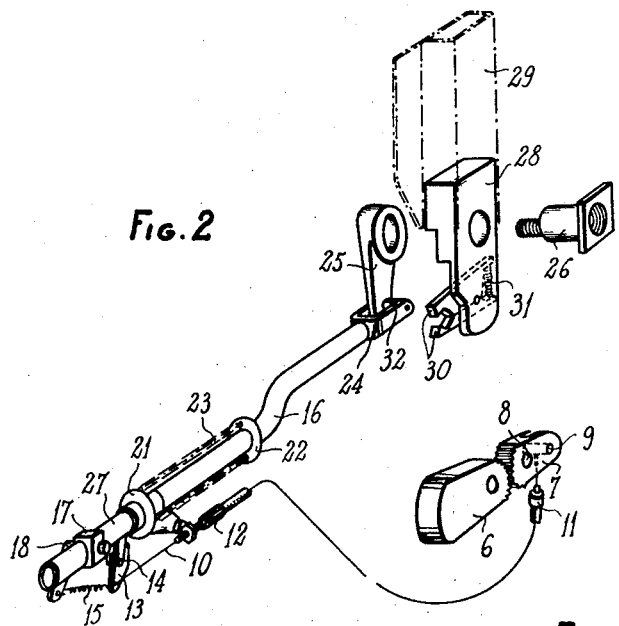
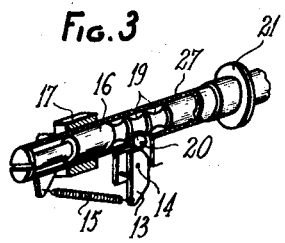
Inventor:
Robert Marechal
by Michael S Striker
Attorney Sept. 26, 1961 R. MARECHAL 3,001,821
ADJUSTABLE SEAT STRUCTURE
Filed June 29, 1959 6 Sheets-Sheet 2
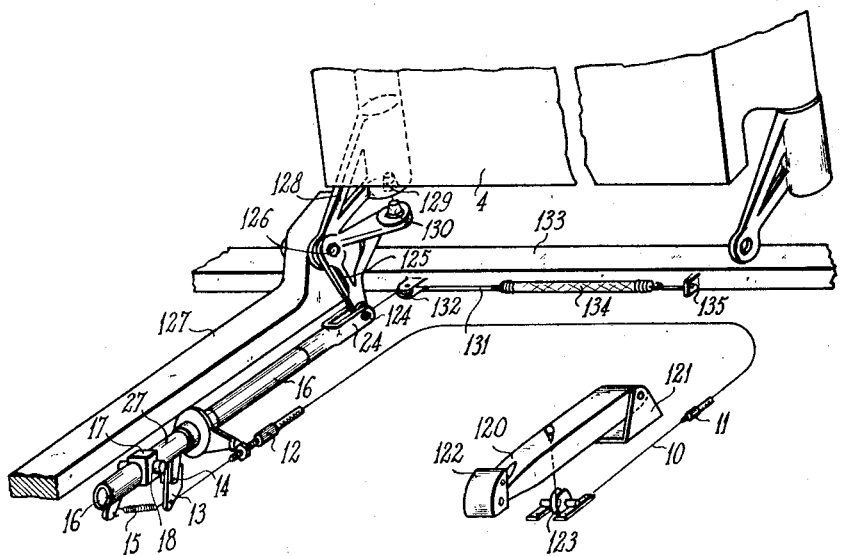
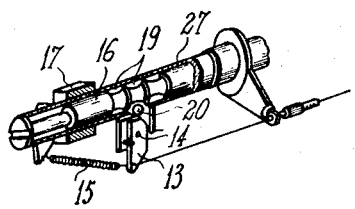
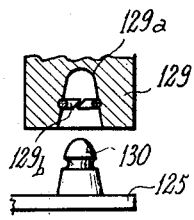

Sept. 26, 1961  R. MARECHAL  3,001,821
ADJUSTABLE SEAT STRUCTURE
Filed June 29, 1959  6 Sheets-Sheet 3

Inventor:
Robert Marechal
by Michael S. Striker
Attorney

Sept. 26, 1961 R. MARECHAL 3,001,821
ADJUSTABLE SEAT STRUCTURE
Filed June 29, 1959 6 Sheets-Sheet 4

Sept. 26, 1961 R. MARECHAL 3,001,821
ADJUSTABLE SEAT STRUCTURE
Filed June 29, 1959 6 Sheets-Sheet 5

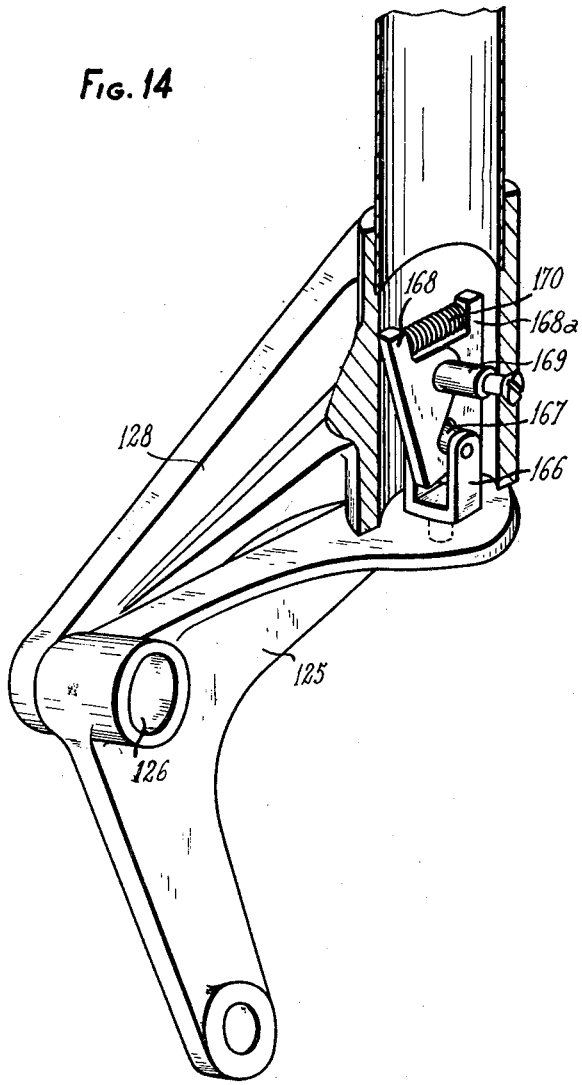

United States Patent Office 3,001,821
Patented Sept. 26, 1961

3,001,821
ADJUSTABLE SEAT STRUCTURE
Robert Marechal, Paris, France, assignor to Societe Industrielle & Commerciale R. Marechal S.I.C.M.A., Issoudun (Indre), France
Filed June 29, 1959, Ser. No. 823,436
Claims priority, application France June 30, 1958
12 Claims. (Cl. 297—366)

This invention relates to adjustable seats of the type in which the tilt angle of the back of the seat can be adjusted by the seated person to suit his convenience. It is especially applicable to such adjustable seats as used in vehicles, including ground vehicles and aircraft.

It is an object of the invention to provide an adjustable seat provided with improved tilt adjusting mechanism which will be simple, strong and reliable. A specific object is to provide such a seat in which the back will be both adjustable in tilt angle in the usual way by an occupant of the seat, and in which said back may, in case of necessity, be quickly and easily swung down to a collapsed condition over the bottom of the seat regardless of its previous adjusted position.

A further object is to provide an adjustable-back seat in which the back can be instantly collapsed in the manner just stated by merely applying a moderate muscular force to the top of the back in a forward direction, without having to trouble first to disable the tilt adjusting mechanism, and in which nevertheless the provision of this rapid-collapse feature will not interfere with the normal tilt-adjusting action.

In an important aspect the invention comprises an adjustable seat structure having a bottom and a back pivoted thereto at the rear thereof, a member having a forward end connected with said bottom, an arm pivoted to said bottom coaxially with said back, means pivotally connecting the rear end of said member with said arm, mutually engageable means on said arm and back for connecting said arm and back for rotation about said pivot, spring means urging said engageable means to an engaged condition, means for adjusting the effective length of said member to adjust the tilt angle of the back in the engaged condition of said mutually engageable means, said last-mentioned means being so constructed and arranged that a direct force applied to said back in a forward direction above said pivot will disengage said engageable means whereupon said back may be swung freely forwards to collapse it over said bottom.

The above and further objects, features and advantages of the invention will appear from the ensuing disclosure in which embodiments of the invention are described for purpose of illustration but not of limitation with reference to the accompanying drawings, wherein:

FIG. 1 is a side view of an improved seat on a small scale;

FIG. 2 is a perspective view of the tilt adjusting and collapsing mechanism of the back of the seat;

FIGS. 3 and 4 are detail views, in perspective, of the latching means for the tilt-adjusting mechanism, respectively in the blocked and released conditions;

FIG. 5 is a perspective view of a modified form of tilt adjusting and collapsing mechanism;

FIG. 6 shows the corresponding latching device;

FIG. 7 is a sectional detail view of the engageable means serving the collapsing or quick-release function in the embodiment of FIG. 5;

FIG. 14 is a perspective view of a modified quick-release or collapsing device.

Figure 8:
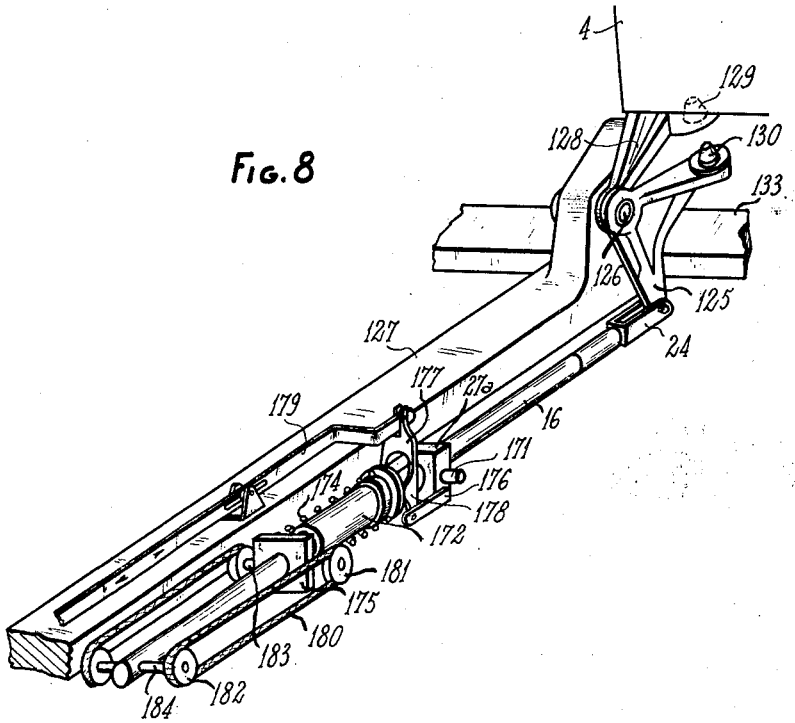
FIG. 8 is a perspective view of another modified tilt-adjusting and collapsing mechanism.

Referring first to FIG. 1, a seat according to the invention comprises a bottom frame 1, a bottom section 2, armrest sections 3 and a tiltable back section 4 pivoted on a pair of side pivots 26 carried by the bottom section 2. Mounted in one of the armrests 3, preferably in the position shown in FIG. 1, is a small projecting actuating lever 6 (see also FIG. 2) pivoted on a pin in the armrest and having gear teeth meshing with corresponding teeth formed on a lever 7 pivoted at 8 in the armrest. The lever 7 has attached to it at a point 9 spaced from the pivot 8 one end of a conventional Bowden cable or wire 10 having an outer tubular casing or sheath which is held axially stationary at one end with a collar 11. The remote end of the sheath is secured beneath the seat section 2 by way of an adjustable collar 12. The axially displaceable inner wire 10 has its far end secured to a cam member 13 pivoted at 14 to the stationary sleeve 27 of a latching assembly presently described, said cam having a tension spring 15 attached to it to urge it leftward according to FIGS. 2 and 3.

The latching assembly comprises the tubular sleeve member 27 secured within a block 17 which in turn is mounted by way of a pivot pin 18 in the stationary bottom frame 1 under the bottom 2 of the seat as indicated in FIG. 1. Slidably mounted in sleeve 27 is a rod 16 formed with annular grooves 19. The sleeve 27 has an opening adjacent said grooves and a ball 20 is movable through said opening by the action of cam 13 so as to be selectively engageable with any one of the grooves 19 depending on which particular groove is positioned in registry with the opening in the sleeve. A coil spring 23 seated at one end against a flange 21 projecting radially from the sleeve 27 and at its other end against a flange 22 projecting from the far end of rod 16 beyond the sleeve 27, acts to urge the rod 16 to an extended position, i.e. rightward in FIGS. 2 and 3.

The latch rod 16 projects a substantial distance beyond the rear end of sleeve 27 as shown in FIG. 2 and carries at its rear end a clevis 24 in which is pivoted by way of a crosspin 32 one end of a crank arm 25 which has its other end rotatably mounted on the back pivot 26. This pivot in turn is secured to a bracket 28 fixedly secured to an upright 29 of the back structure.

The bracket 28 at its lower end has a pair of clamping jaws 30 pivoted thereto and having outer ends engageable around the crosspin 32. A spring 31 acting against the jaws 30 tends to urge them into clamping engagement with the crosspin.

The system described operates as follows. When the occupant of the armchair wants to alter the tilt angle of the backrest to his convenience, he acts on the finger-lever 6 which, by way of Bowden wire 10, rocks cam 13 counterclockwise about its pivot against the action of spring 15, whereby the ball 20 drops out of the particular groove 19 in latch rod 16 in which it was previously engaged. In this unlatched condition the spring 23 urges the latchrod 16 rightward, and since the lower end of bracket 28 is at this time connected with the crosspin 32 at the rear end of rod 16 owing to the clamping engagement of the jaws 30, the action of compression spring 23 tends to rock the back 4 bodily counterwise about its pivots 26, i.e. in the forward direction. If the user wants to readjust the back of the chair to a more forward or vertical position he will therefore allow such movement to occur under the action of the spring 23, whereas if he is wanting a more rearward tilt of the back, he need simply apply rearward pressure with his body against the back of the chair to counteract the action of spring 23 until the desired tilt angle has been reached. In either case on release of the finger control 6 the cam 14 will reinsert the ball 20 into the notch 19 newly positioned in register with it to latch the rod 16 and the back 4 in the selected position. It will be understood that a greater number of grooves 19 than the three shown may be provided in order to provide any desired range of tilt adjustment.

In order to collapse the back 4 to a forward position over the bottom 2 (with no one seated in the chair of course), it is simply necessary to exert a forward push against the rear side of back 4 above the line of pivots 26. This results in opening the clamping jaws 30 and disengaging the bracket 28 from the crosspin 32, whereupon the back can be swung freely about its pivots 26 in the forward direction to drop to its collapsed condition upon the seat.

In the modified construction of FIGS. 5 to 7, in which corresponding parts have been similarly numbered as in FIGS. 1 to 4, the unlatching control mechanism is the form of a lever 120 pivoted on a mount 121 secured to the armrest 3 and having secured to its free end an actuating knob 122 projecting from the armrest; attached to the lever 120 is one end of the Bowden wire 10, which is trained about a small pulley 123. It will be understood however that the particular form of control for actuating the wire 10 is immaterial, and that the control shown in FIGS. 1 to 4 may be used in the construction of FIGS. 5 to 7, or vice-versa. The far end of wire 10 acts upon a cam 13 to engage or disengage selectively a ball 20 in a selected groove 19 formed in latchrod 16 slidable in sleeve 27 all as in the first embodiment. In the present case however, the clevis 24 at the rear end of latchrod 16 has pivoted on a crosspin 124 therein one arm of a first V-shaped bracket 125 which has its apex freely pivoted on one, 126, of the two side pivots of the back structure 4. Pivoted coaxially with bracket 125 on the same pivot 126 is the apex of another V-shaped bracket 128 which is rigidly secured to the back structure 4. In the normal condition of use of the chair the two brackets 125, 128 are firmly connected for rotation with each other by the following means. The bracket 128 has a cylindrical portion 129 (see FIG. 7) in which is formed a downwardly open socket 129a having a spring-clip or snapring 129b secured within it. Formed on the bracket 125 is an upwardly projecting stud 130 which is engageable in the socket and has a circumferential groove adapted to cooperate with the snap ring 129b for releasably locking the two brackets together.

A further, though minor, difference of the construction being described over the first embodiment is that the spring 23 for urging the rod 16 rearwardly is here replaced by an arrangement including a cord or wire 131 having one end attached to clevis 24 and trained around a pulley 132 journalled in a bracket projecting from a rear cross member 133 of the bottom frame. The wire 131 has its other end attached to an extensor 134 having its opposite end attached to a lug 135 on member 133.

The general operation of this embodiment is entirely similar to that of the first and need not again be described since it will be readily understood in the light of the explanations given. It should however be understood that the assembly including the brackets 125, 128 releasably connectable by way of the stud-and-snapring device 130—129b is comparable in function with the spring jaws 30 of FIG. 2. That is, with the stud engaging the snap ring in the socket, it will be seen that disengagement of ball 20 from a groove 19 of rod 16 by action on finger control 122, will permit tilt adjustment of the back 4 by forward or backward body movement of the occupant of the seat. However, pushing the upper part of back 4 forward when the seat is unoccupied will immediately disengage the snap ring 129b from off the stud 130, and the back can then be swung down to its collapsed condition on the seat section 2 of the chair.

Figure 9:
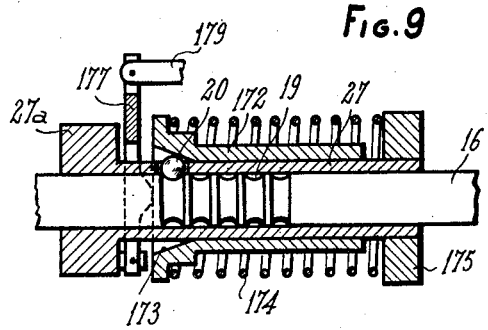
FIGS. 9 and 10 are sectional views of the latching device therein, respectively, in the blocked and released conditions.
Figure 10:
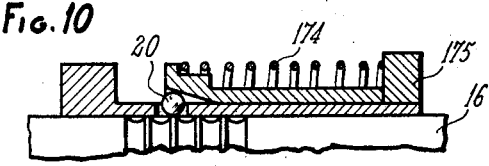

The modification shown in FIGS. 8–10 now to be described, represents a somewhat more robust construction of the latching mechanism. As in the foregoing embodiment, a latch rod 16 has a clevis 24 at its rear end which has a V-bracket 125 pivoted therein with its apex rotatable on the back pivot 126, while another V-bracket 128 having its apex also rotatable on said pivot 126 is secured to the back structure 4 and is releasably connectable with the first bracket by way of the stud and snapring connection 129—130.

The rod 16 slidable in sleeve 27 has the plurality of grooves 19 formed in it in any one of which is preferably engageable an angularly equispaced set of balls 20, e.g. three, only one of which is shown, said balls being radially movable through related apertures in the sleeve 27. For camming the balls simultaneously into and out of engagement with a selected groove 19, there is here provided an outer camming sleeve 172 slidably surrounding the sleeve 27 and formed at one end with a flared camming section 173 cooperating with the balls 20 so that axial displacement of outer sleeve 172 will selectively engage and disengage the balls into and out of the grooves. The camming sleeve 172 is urged in the direction to engage the balls into the grooves by a spring 174 acting between a flange of the camming sleeve and a nut 175 secured on the remote end of sleeve 27. In FIGS. 8 to 10, the block secured to sleeve 27 and corresponding to block 17 in FIGS. 1 to 4 is designated 27a, and the pin corresponding to pin 18 of the latter figures for pivoting the latching assembly to a side member 127 of the seat frame is here designated 171. Further it is to be noted that FIGS. 9 and 10 are axial cross sectional views as seen from the rear of FIG. 8, so that the parts in FIGS. 9 and 10 appear inverted as compared to the same parts in FIG. 8.

For imparting axial displacements to cam sleeve 172 there is provided a shifter fork 177 which has its lower ends pivoted to a pair of arms 176 projecting forwardly from the block 27a and having its upper end pivoted to a control link 179 which extends forwardly to terminate in any convenient form of control not shown. The sides of fork 177 have convex portions 178 which engage the end of the sleeve 172 so that forward displacement of link 179 will urge camming sleeve 172 forward to release the balls 20 from the grooves 19, while on release of the link 179 the spring 174 will urge the cam sleeve rearward to reinsert the balls into a groove. Further in this construction the spring force serving to bias the back 4 in its forwardly tilting direction is shown as being provided by the extensor cords 180 formed as loops having their one ends mounted on pulleys 181 mounted on pins 183 on nut member 175 secured to sleeve 27 and their other ends on pulleys 182 mounted on pins 184 projecting from the front end of rod 16.

Figure 11:
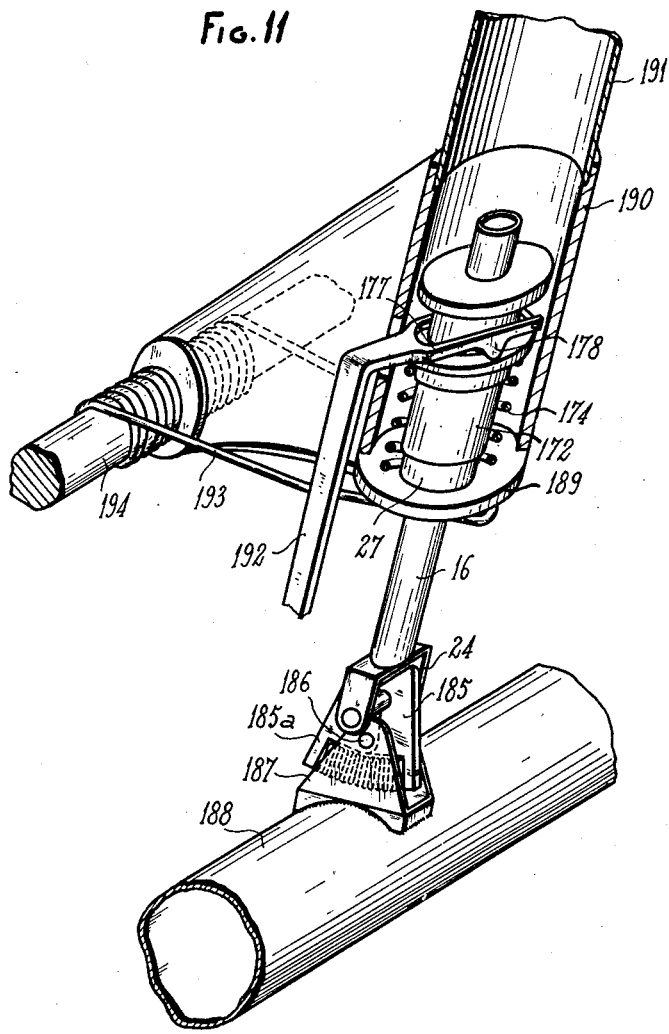
FIG. 11 illustrates another embodiment in perspective.

The embodiment illustrated in FIG. 11 differs from the foregoing ones in the relative arrangement of the tilt-adjusting mechanism and the collapsing or release means, rather than in the construction of each of these means per se. Here the tilt-adjusting mechanism is shown generally similar to that last described (FIGS. 8–10), but the assembly is mounted in a tubular recess provided in a bracket 190 fitted to the lower end of a tubular side member or upright 191 forming part of the back structure 4, and the latchrod 16 projects downwardly from said upright and carries the clevis 24 at its lower end. The release device associated with the clevis is of a type comprising a pair of clamping jaws 185, 185a pivoted at 186 on a stirrup 187 upstanding from a side member 188 forming part of the bottom structure 2. With the jaws 185, 185a gripping the crosspin of the clevis 24 under the action of the spring shown, reciprocation of the rod 16 will cause the back 4 to swing forward or rearward as required, provided the camming sleeve 172 has first been shifted to its lowermost position to unlock the rod 16 in the manner described above for FIGS. 8–10. Shifting of the camming sleeve is effected by means of a fork 177—178 which is shown directly actuable by means of a rod 192. If desired however, a flexible actuating means may be provided. Upward shifting of the camming sleeve 172 on release of the fork is produced by the biassing spring 174. Forward bias of the back 4 is here produced by a coil spring arrangement 193 having its ends mounted on a rod 194 fixed to bracket 190, and its intermediate portion acting upwardly against the under side of a flange 189 secured to sleeve 27.

Figure 12:
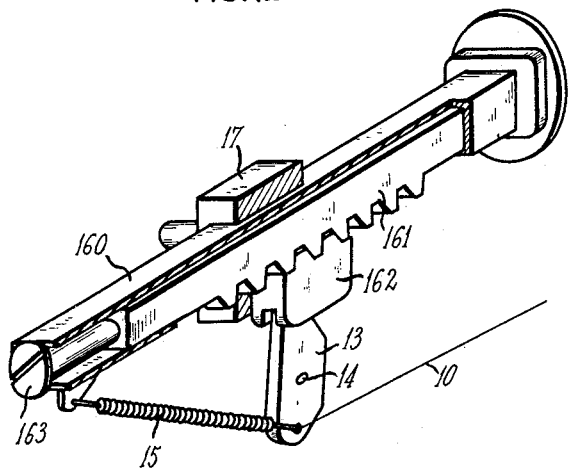
FIG. 12 illustrates in perspective a modified form of latching device for the tilt-adjusting mechanism.

FIG. 12 shows an alternative tilt-adjusting latch arrangement in which the groove-rod and ball system so far described is replaced by a toothed latching device. Here the latching assembly comprises a channel 160 (corresponding to sleeve 27) pivoted by way of block 17 to the stationary seat structure and a rackbar 161 slidable in the channel with a plurality of rack teeth projecting downwardly through a slit in the channel. Cooperating with the rackteeth is a latching member 162 formed with a few complementary teeth and movable upwards and downwards through the slit in the channel 160. The latch member 162 is actuated by a pivoted cam 13 which may be similar as to its mounting and as to its operating mechanism as the similarly numbered cam in the first two embodiments described. The rackbar 161 has its rear end connected to the backrest through any of the releasable collapsing means described so far. With said releasable means engaged so that the rackbar is effectively connected with the back 4, it will be seen that action on wire 10 to operate cam 13 in opposition to its spring 15 will selectively engage or disengage the latch teeth 162 with the teeth of the rack to lock the back in its selected position. Screw 163 provides an end abutment between the rackbar and the channel 160.

Figure 13:
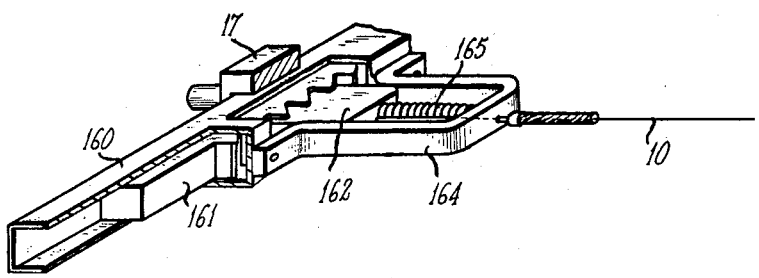
FIG. 13 is a perspective view of another modified latching device.

The modification shown in FIG. 13 differs from the one just described in that the actuating wire 10 here operates the latch member 162 directly rather than through an interposed cam. For this purpose the latch 162 is slidably guided in a stirrup member 164 having its arms secured to the channel casing 160 and internally formed as a guide for the sides of the latch 162. A spring 165 biasses the latch to its latching position.

FIG. 14 illustrates in greater detail a suitable construction of a release mechanism for collapsing the back 4, of the type using a pair of clamping jaws as in FIG. 11, and also broadly in FIGS. 1–4. This clamping jaw mechanism however is here shown as being associated with the pair of V-shaped brackets 125 and 128 coaxially pivoted on the back pivot 126 as in FIGS. 5–7 and FIGS. 8–10. Upstanding from an arm of bracket 125 connected with the tilting mechanism (not here shown) is a clevis 166 having a crosspin 167 thereon. The bracket 128 rigid with the back 4 has the pair of jaws 168—168a pivoted on the common pivot 169 thereon and urged by a spring 170 into engagement about the pin 167. In normal use of the chair the jaws are thus clasping the pin and the back 4 is therefore effectively connected with its tilt adjusting mechanism. However, a forward push applied to the top of the back will disengage the crosspin 167 from the jaws and release the back for collapsing it down againsts the bottom of the seat.

It will be understsood that many variations other than the embodiments described may be conceived within the framework of the ensuing claims, as by combining various structural features amongst the various embodiments described in different manners.

What I claim is:

1. In an adjustable seat structure having a bottom section and a back section pivoted thereto, a tilt-adjusting member having one end connected with one of said sections and another end, means for releasably connecting the other end of said member with the other section, and means for adjusting the effective length of said member whereby to adjust the tilt angle of said other section, said connecting means responsive to manual pressure to release the other end of said member from said other section whereby said other section is freely pivotable for collapse over said one section.

2. In an adjustable seat structure having a bottom and a back pivoted thereto, a tilt-adjusting member having one end connected with said bottom and another end, means for releasably connecting the other end of said member with said back including spring means for biasing said connecting means into a connecting position, means for adjusting the effective length of said member whereby to adjust the tilt angle of the back in the connecting position of said connecting means, and said connecting means being responsive to a direct forward pressure applied to said back against the bias of said spring means for permitting disconnection of the other end of said member from said back whereupon said back is freely collapsible over said bottom.

3. In an adjustable seat having a bottom and a back pivoted thereto, a member having an end connected with said bottom and another end, means for releasably connecting the other end of said member with said back, means for adjusting the effective length of said member whereby to adjust the tilt angle of said back in connecting position of said connecting means, means for normally blocking the member in an adjusted position, means operable by an occupant of the seat for releasing said blocking means whereby to permit adjustment in the tilt angle of the back in the connecting position of said connecting means, and said connecting means being responsive to a force applied to said back for permitting disconnection of the other end of said member from said back whereupon said back is freely collapsible over said bottom.

4. In an adjustable seat having a bottom and a back pivoted thereto at the rear thereof, a member having a forward end connected with said bottom and a rear end, an arm, pivot means for connecting said arm to said bottom coaxially with said back, means pivotally connecting the rear end of said member with said arm, mutually engageable means on said arm and on said back for connecting said arm and said back for bodily rotation about said pivot means, spring means for normally biasing said mutually engageable means to a connecting position, means for adjusting the effective length of said member whereby to adjust the tilt angle of the back rearward and forward in the connecting position of said mutually engageable means, said mutually engageable means responsive to pressure applied to said back in a forward direction above said pivot means to move from said connecting position and to permit disengagement of said arm from said back whereupon said back may be swung freely in forward direction to collapse over said bottom.

5. A seat structure as claimed in claim 4, wherein said mutually engageable means comprise at least one hooking element pivoted to said back and a hookable element on said arm engageable by said hooking element under the bias of said spring means, said hooking element being so directed that said forward pressure applied to the back above said pivot means will disengage the hooking element from the hookable element against the bias of said spring means.

6. A seat structure as claimed in claim 4, wherein said mutually engageable means comprise a pair of clasping jaws pivoted to said back and an element on said arm claspable by said jaws under the bias of said spring means, said jaws so directed that said forward pressure applied to the back above the pivot means will disengage said jaws from said element against the bias of said spring means.

7. A seat structure as claimed in claim 4, wherein said mutually engageable means comprise a groove on one of the pair of parts consisting of said arm and back and a cooperating snap ring on the other of said pair of parts engageable with said groove under the bias of said spring means, said groove and snap ring so positioned that said forward pressure applied to the back above the pivot means will move the snap ring out of said groove against the bias of said spring means.

8. In a seat structure a stationary bottom section and a back section, means interpivoting said sections about an axis at the rear of said bottom section, an arm pivoted above said axis for free rotation with respect to said sections, an assembly comprising a pair of telescopically related parts, means connecting an outer end of one of said parts with one of said sections, means pivoting the outer end of the other part to said arm, mutually engageable means on said arm and said other section for connecting the same for rotation about said pivot, spring means normally urging said mutually engageable means to an engaged condition, means for resiliently blocking the two parts of said assembly in an adjusted relative position for determining the tilt angle of said back section in the engaged condition of said mutually engageable means, spring means biasing said telescopic assembly to a position in which said back section is tilted by a predetermined minimum amount from vertical, means operable by an occupant of the seat to temporarily release said blocking means whereby to readjust the tilt angle of said back section by bodily movements of said occupant, and said mutually engageable means being so positioned that force applied to said back section in a forward direction above the pivot will disengage said engageable means whereupon said back section may be swung freely forward and collapsed over said bottom section while said seat is unoccupied.

9. A seat structure as claimed in claim 8 wherein said telescopic parts respectively comprise a sleeve and a rod slidable therein, said blocking means comprise axially spaced grooves in said rod and at least one ball movable into and out of engagement with a selected groove for blocking said rod with respect to said sleeve, camming means engaging said ball, and spring means urging said camming means to move said ball into engagement with a groove, and said occupant-operable means comprise means connected with said cam for displacing the cam in opposition to said spring means for moving the ball out of engagement with a groove.

10. A seat structure as claimed in claim 8 wherein one of said telescopic parts has longitudinally spaced indentations therein, latch means connected with the other part and movable into and out of engagement with a selected indentation to block said telescopic parts in a selected relative position, camming means engaging said latch means, and spring means urging said camming means to move said latch means into engagement with an indentation, and said occupant-operable means comprise means connected with said camming means for moving the cam in opposition to said spring means to move the latch means out of engagement with an indentation.

11. A seat structure as claimed in claim 10, wherein said occupant-operable means comprise a flexible wirelike element having one end connected with said camming means and means conveniently manipulable by an occupant seated in said seat for displacing said wirelike element to actuate said camming means.

12. A seat structure as claimed in claim 9, wherein said camming means comprise a camming sleeve slidable around said first mentioned sleeve and said means connected with said cam comprise a shifter fork.

References Cited in the file of this patent

UNITED STATES PATENTS

| 2,750,993 | McGregor | June 19, 1956 |
| 2,783,826 | Haltenberger | Mar. 5, 1957 |